United States Patent
Ko et al.

(10) Patent No.: US 10,111,121 B2
(45) Date of Patent: *Oct. 23, 2018

(54) LOCALIZING FAULTS IN WIRELESS COMMUNICATION NETWORKS

(71) Applicant: International Business Machines Corporation, Armonk, NY (US)

(72) Inventors: Bong Jun Ko, Harrington Park, NJ (US); Kang-Won Lee, Nanuet, NY (US); Ramya Raghavendra, White Plains, NY (US); Murtaza Zafer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,524

(22) Filed: Apr. 25, 2017

(65) Prior Publication Data

US 2017/0230851 A1    Aug. 10, 2017

Related U.S. Application Data

(63) Continuation of application No. 14/230,044, filed on Mar. 31, 2014.

(51) Int. Cl.
| | |
|---|---|
| *H04W 24/08* | (2009.01) |
| *H04M 3/22* | (2006.01) |
| *H04M 3/08* | (2006.01) |

(52) U.S. Cl.
CPC .......... *H04W 24/08* (2013.01); *H04M 3/085* (2013.01); *H04M 3/2218* (2013.01); *H04M 2207/18* (2013.01)

(58) Field of Classification Search
CPC ............... H04M 3/2218; H04M 3/085; H04M 2207/18; H04W 24/08

See application file for complete search history.

(56) References Cited

U.S. PATENT DOCUMENTS

| | | | |
|---|---|---|---|
| 5,561,841 A | 10/1996 | Markus | |
| 5,761,502 A | 6/1998 | Jacobs | |

(Continued)

FOREIGN PATENT DOCUMENTS

| | | |
|---|---|---|
| EP | 1303121 A1 | 4/2003 |
| EP | 1465446 | 10/2004 |

(Continued)

OTHER PUBLICATIONS

Wang, H., et al., "Transportation Mode Inference From Anonymized and Aggregated Mobile Phone Call Detail Records" 2010 13th International IEEE Conference on Intelligent Transportation Systems, Sep. 2010, pp. 318-323, 978-1-4244-7659-6110, copyright 2010 IEEE.

(Continued)

*Primary Examiner* — Ian N Moore
*Assistant Examiner* — Justin T Van Roie
(74) *Attorney, Agent, or Firm* — Fleit Gibbons Gutman Bongini Bianco PL; Thomas S. Grzesik

(57) ABSTRACT

Various embodiments manage service issues within a wireless communication network. In one embodiment, a one or more call detail records associated with a set of wireless communication devices of a wireless communication network is received. A set of information within each of the one or more call detail records is compared to a baseline statistical model. The baseline statistical model identifies a normal operating state of the wireless communication network. At least one outlier call detail record in the one or more call detail records is identified based on the comparison. The at least one outlier call detail record indicates that at least one wireless communication device associated with the at least one outlier call detail record experienced one or more service issues.

14 Claims, 4 Drawing Sheets

(56) References Cited

U.S. PATENT DOCUMENTS

| | | |
|---|---|---|
| 5,920,607 A | 7/1999 | Berg |
| 5,999,604 A | 12/1999 | Walter |
| 6,298,123 B1 | 10/2001 | Nolting et al. |
| 6,317,599 B1 | 11/2001 | Rappaport et al. |
| 6,336,035 B1 | 1/2002 | Somoza et al. |
| 6,970,542 B2 | 11/2005 | Moisey et al. |
| 6,985,731 B1 | 1/2006 | Johnson et al. |
| 7,043,661 B2 | 5/2006 | Valadarsky et al. |
| 7,246,045 B1 | 7/2007 | Rappaport et al. |
| 7,475,003 B1 | 1/2009 | Madhusudhana et al. |
| 7,555,261 B2 | 6/2009 | O'Neill |
| 7,609,826 B2 | 10/2009 | Liu et al. |
| 8,131,300 B2 | 3/2012 | Sartori et al. |
| 8,135,414 B2 | 3/2012 | Khokhar |
| 8,229,163 B2 | 7/2012 | Coleman et al. |
| 8,369,230 B1 | 2/2013 | Croak et al. |
| 8,391,836 B1 | 3/2013 | Bolot et al. |
| 8,406,398 B2 | 3/2013 | Gore |
| 8,634,527 B2 | 1/2014 | Chung et al. |
| 8,861,691 B1 | 10/2014 | De et al. |
| 9,456,312 B2 | 9/2016 | Gupta et al. |
| 2002/0083166 A1 | 6/2002 | Dugan et al. |
| 2002/0107634 A1 | 8/2002 | Luciani |
| 2005/0107095 A1 | 5/2005 | Samuel |
| 2005/0123121 A1* | 6/2005 | McCormick ............ H04M 3/08 379/221.03 |
| 2005/0262106 A1 | 11/2005 | Enqvist |
| 2006/0141983 A1 | 6/2006 | Jagannathan et al. |
| 2006/0274703 A1 | 12/2006 | Connelly |
| 2006/0293025 A1 | 12/2006 | Chiou et al. |
| 2007/0035390 A1 | 2/2007 | Thomas et al. |
| 2007/0153807 A1 | 7/2007 | Cruz et al. |
| 2007/0191010 A1 | 8/2007 | Kim et al. |
| 2008/0019493 A1 | 1/2008 | Kreckel et al. |
| 2008/0046306 A1 | 2/2008 | Egner et al. |
| 2008/0288427 A1 | 11/2008 | Barson et al. |
| 2009/0067423 A1 | 3/2009 | Visser |
| 2009/0207741 A1 | 8/2009 | Takahashi |
| 2009/0304165 A1 | 12/2009 | Chung et al. |
| 2009/0318132 A1 | 12/2009 | Chiou et al. |
| 2010/0135476 A1 | 6/2010 | Paden et al. |
| 2010/0144367 A1 | 6/2010 | Goh et al. |
| 2010/0167722 A1 | 7/2010 | Madhavan et al. |
| 2010/0261449 A1 | 10/2010 | Mishkin |
| 2010/0312612 A1 | 12/2010 | Carr et al. |
| 2011/0184961 A1 | 7/2011 | Aertebjerg et al. |
| 2011/0212721 A1 | 9/2011 | Chang et al. |
| 2011/0295577 A1 | 12/2011 | Ramachandran |
| 2012/0115505 A1 | 5/2012 | Miyake et al. |
| 2012/0163225 A1 | 6/2012 | Mishkin et al. |
| 2012/0178413 A1 | 7/2012 | Schliesser et al. |
| 2012/0221232 A1 | 8/2012 | Shang et al. |
| 2012/0231781 A1 | 9/2012 | Kumar et al. |
| 2012/0270561 A1 | 10/2012 | Giustina et al. |
| 2012/0284080 A1 | 11/2012 | De Oliveira et al. |
| 2012/0303413 A1 | 11/2012 | Wang et al. |
| 2013/0053055 A1 | 2/2013 | Kumar |
| 2013/0095817 A1 | 4/2013 | Karla et al. |
| 2013/0095880 A1 | 4/2013 | Tzamaloukas |
| 2013/0183996 A1 | 7/2013 | Scarr et al. |
| 2014/0128058 A1 | 5/2014 | Ji et al. |
| 2014/0192676 A1 | 7/2014 | Sullivan |
| 2014/0211785 A1 | 7/2014 | Majd et al. |
| 2015/0004999 A1 | 1/2015 | Schuler et al. |
| 2015/0319605 A1 | 11/2015 | Gupta et al. |

FOREIGN PATENT DOCUMENTS

| | | |
|---|---|---|
| EP | 2432155 A1 | 3/2012 |
| EP | 2521288 | 7/2012 |
| WO | 9723085 | 6/1997 |

OTHER PUBLICATIONS

Kavulya, S., et al., "Draco: Top-Down Statistical Diagnosis of Large-scale VoIP Networks," Apr. 2011,Parallel Data Laboratory, Carnegie Mellon University, AT&T Lab—Research, CMU-PDL-11-109.

Zhang, H., et al., "Change Point Detection based on Call Detail Records," ISI 2009, Jun. 2009, pp. 55-60, 378-1-4244-4173-0/09/ $25.00, Copyright 2009 IEEE.

Fiadino, P., et al., "Steps towards the Extraction of Vehicular Mobility Patterns from 3G Signaling Data," TMA 2012, LNCS 7189, Mar. 2012, pp. 66-80, copyright Springer-Verlag Verlin Heidelberg 2012.

Tzavidas, S., et al., "Channel Mesurement-Based Backup of Control Information in Distributed Cellular Architectures," Aug. 17, 2005, pp. 1-5, IPCOM00127010D, Copyright Motorola, Inc. Aug. 17, 2005.

Hohwald, H., et al., "User Modeling for Telecommunication Applications: Experiences and Practical Implications," User Modeling, Adaption and Personalization, Proceedings 18th International Conference, Digital Object Identifier: 10.1007/978-3-642-13470-8_30, Jun. 20-24, 2010, pp. 327-338.

Non-Final Office Action dated Aug. 13, 2015, received for U.S. Appl. No. 14/258,676.

Non-Final Office Action dated Sep. 25, 2015, received for U.S. Appl. No. 14/258,598.

Final Office Action dated Feb. 2, 2016 received for U.S. Appl. No. 14/258,676.

Non-Final Office Action dated Mar. 28, 2016, received for U.S. Appl. No. 14/266,082.

Non-Final Office Action dated May 6, 2016, received for U.S. Appl. No. 15/086,219.

Non-Final Office Action dated Oct. 28, 2016, received for U.S. Appl. No. 15/265,924.

Non-Final Office Action dated Apr. 14, 2017, received for U.S. Appl. No. 15/086,180.

Notice of Allowance dated for Aug. 1, 2016, received for U.S. Appl. No. 15/086,219.

U.S. Appl. No. 15/232,950 filed Aug. 10, 2016.

Notice of Allowance dated for Jul. 26, 2016, received for U.S. Appl. No. 14/266,082.

Notice of Allowance dated for Jun. 14, 2016, received for U.S. Appl. No. 14/258,676.

Final Office Action dated for Apr. 8, 2016, received for U.S. Appl. No. 14/230,044.

Non-Final Office Action dated for Aug. 31, 2015, received for U.S. Appl. No. 14/230,044.

* cited by examiner

LOCALIZING FAULTS IN WIRELESS COMMUNICATION NETWORKS

BACKGROUND

The present invention generally relates to wireless communication networks, and more particularly relates to localizing faults in wireless communication networks based on call detail records.

Failures that impact the experience of mobile users in wireless cellular networks can be caused by a variety of sources. For example, failures can be caused by failures in the network elements, degradation of wireless link quality, faulty user devices and applications, over the top (OTT) service failures, etc. Monitoring all potential resources that can impact user experience, and correlating the monitored results with individual customer experiences is generally infeasible. For example, the network elements in carrier networks may be continuously monitored for their performance and failures. However, such monitoring usually does not indicate whether the fault lies in the network element, the user's device, the partner network, or the service that the user tries to access.

BRIEF SUMMARY

In one embodiment, a method for managing service issues within a wireless communication network is disclosed. The method comprises receiving a one or more call detail records associated with a set of wireless communication devices of a wireless communication network. A set of information within each of the one or more call detail records is compared to a baseline statistical model. The baseline statistical model identifies a normal operating state of the wireless communication network. At least one outlier call detail record in the one or more call detail records is identified based on the comparison. The at least one outlier call detail record indicates that at least one wireless communication device associated with the at least one outlier call detail record experienced one or more service issues.

In another embodiment, an information processing system for managing service issues within a wireless communication network is disclosed. The information processing system comprises a memory and a processor that is communicatively coupled to the memory. A network monitoring system is communicatively coupled to the memory and the processor. The network monitoring system is configured to perform a method. The method comprises receiving one or more call detail records associated with a set of wireless communication devices of a wireless communication network. A set of information within each of the one or more call detail records is compared to a baseline statistical model. The baseline statistical model identifies a normal operating state of the wireless communication network. At least one outlier call detail record in the one or more call detail records is identified based on the comparison. The at least one outlier call detail record indicates that at least one wireless communication device associated with the at least one outlier call detail record experienced one or more service issues.

In yet another embodiment, a computer program storage product for managing service issues within a wireless communication network is disclosed. The computer program storage product comprising instructions configured to perform a method. The method comprises receiving one or more call detail records associated with a set of wireless communication devices of a wireless communication network. A set of information within each of the one or more call detail records is compared to a baseline statistical model. The baseline statistical model identifies a normal operating state of the wireless communication network. At least one outlier call detail record in the one or more call detail records is identified based on the comparison. The at least one outlier call detail record indicates that at least one wireless communication device associated with the at least one outlier call detail record experienced one or more service issues.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
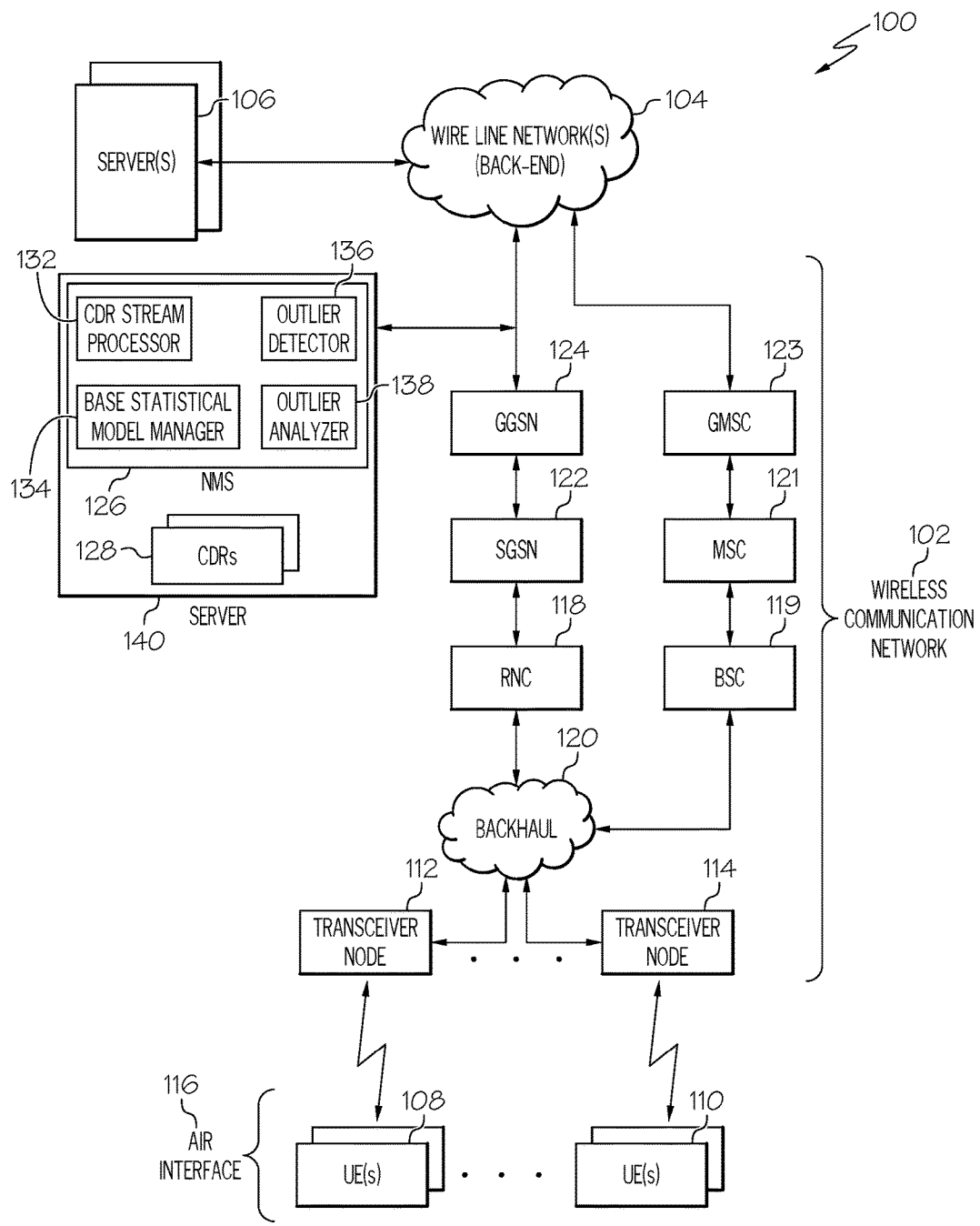
FIG. 1 is a block diagram illustrating one example of an operating environment according to one embodiment of the present invention.

FIG. 1 shows an operating environment 100 according to one embodiment of the present invention. The operating environment 100 comprises one or more wireless communication networks 102 that are communicatively coupled to one or more wire line networks 104. For purposes of simplicity, only the portions of these networks that are relevant to embodiments of the present invention are described. The wire line network 104 acts as a back-end for the wireless communication network 102. In this embodiment, the wire line network 104 comprises one or more access/core networks of the wireless communication network 102 and one or more Internet Protocol (IP) networks such as the Internet. The wire line network 104 communicatively couples one or more servers 106 such as (but not limited to) content sources/providers to the wireless communication network 102. In further embodiments, the back-end is not a wire line network. For example, the back-end takes the form of a network of peers in which a mobile base station (e.g., eNode B in the case of GSM and its descendants) is itself used as a back-end network for other base stations.

The wireless communication network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication network 102 includes one or more networks based on such standards. For example, in one embodiment, the wireless communication network 102 comprises one or more of a Long Term Evolution (LTE) network, LTE Advanced (LTE-A) network, an Evolution Data Only (EV-DO) network, a GPRS network, a Universal Mobile Telecommunications System (UMTS) network, and the like.

FIG. 1 further shows that one or more user devices (also referred to herein as "user equipment (UE)") 108, 110 are communicatively coupled to the wireless communication network 102. The UE devices 108, 110, in this embodiment, are wireless communication devices such as two-way radios, cellular telephones, mobile phones, smartphones, two-way pagers, wireless messaging devices, laptop computers, tablet computers, desktop computers, personal digital assistants, and other similar devices. UE devices 108, 110 access the wireless communication network 102 through one or more transceiver nodes 112, 114 using one or more air interfaces 116 established between the UE devices 108, 110 and the transceiver node 112, 114.

In another embodiment, one or more UE devices 108, 110 access the wireless communication network 102 via a wired network and/or a non-cellular wireless network such as, but not limited to, a Wireless Fidelity (WiFi) network. For example, the UE devices 108, 110 can be communicatively coupled to one or more gateway devices via wired and/or wireless mechanisms that communicatively couples the UE devices 108, 110 to the wireless communication network 102. This gateway device(s), in this embodiment, communicates with the wireless communication network 102 via wired and/or wireless communication mechanisms.

The UE devices 108, 110 interact with the wireless communication network 102 to send/receive voice and data communications to/from the wireless communication network 104. For example, the UE devices 108, 110 are able to wirelessly request and receive content (e.g., audio, video, text, web pages, etc.) from a provider, such as the server 106, through the wireless communication network 102. The requested content/service is delivered to the wireless communication network 102 through the wire line network 104.

A transceiver node 112, 114 is known as a base transceiver station (BTS), a Node B, and/or an Evolved Node B (eNode B) depending on the technology being implemented within the wireless communication network 104. Throughout this discussion a transceiver node 112, 114 is also referred to as a "base station". The base station 112, 114 is communicatively coupled to one or more antennas and a radio network controller (RNC) 118 and/or base station controller (BSC) 119, which manages and controls one or more base station 112, 114. It should be noted that in a 4G LTE network, the eNodeB communicates directly with the core of the cellular network.

The RNC 118 and/or BSC 119 can be included within or separate from a base station 112, 114. The base stations 112, 114 communicate with the RNC 118 over a backhaul link 120. In the current example, a base station 112, 114 is communicatively coupled to a Serving GPRS Support Node (SGSN) 122, which supports several RNCs 118. The SGSN 122 is communicatively coupled to Gateway GPRS Support Node (GGSN) 124, which communicates with the operator's service network (not shown). The operator's service network connects to the Internet at a peering point. It should be noted that even though UMTS components are illustrated in FIG. 1 embodiments of the present invention are applicable to other wireless communication technologies as well.

In another example, the base stations 112, 114 communicate with the BSC 119 over the backhaul link 120. In this example, a base station 112, 114 is communicatively coupled to a mobile switching center (MSC) 121, which supports several BSCs 119. The MSC 121 performs the same functions as the SGSN 122 for voice traffic, as compared to packet switched data. The MSC 121 and SGSN 122 can be co-located. The MSC 121 is communicatively coupled to a gateway mobile switching center (GMSC) 123, which routes calls outside the mobile network.

In one example, the communication protocols between the UE devices 108, 110 and the GGSN 124 are various 3rd Generation Partnership Project (3GPP) protocols over which the internet protocol (IP) traffic from the UE devices 108, 110 is tunneled. For example, a GPRS tunneling protocol (GTP) is utilized between the RNC 118 and the GGSN 124. A standard Internet Protocol (IP) is utilized between the GGSN 124 and the wire line network 104. The server(s) 106 has a TCP (Transmission Control Protocol) socket that communicates with a TCP socket at the UE devices 108, 110 when a user wishes to access data from the server 106. An IP tunnel is created from the GGSN 124 to UE devices 108, 110 for user traffic and passes through the interim components, such as the RNC 118 and the SGSN 122.

A network monitoring system (NMS) 126, in one embodiment, is implemented within or communicatively coupled to the wireless communication network 102. The NMS 126 is configured to detect and localize failures (and their causes) experienced by users of the network 102 based on a variety of information sources including call detail records (CDRs) 128, also referred to as "charging data records" or "call data records". The NMS 126, in one embodiment, analyzes CDRs 128 in real-time (or at configurable time intervals) to detect and localize the causes of the failures that mobile users experience in the network. In this embodiment, the NMS 126 builds and updates (in real-time or a configurable time intervals) a baseline statistical model 130 of the data connection or voice call failures from available CDR data.

The NMS 126 analyzes the failure symptoms recorded in individual CDRs 128 to identify the states that deviate significantly from the dynamic baseline model 130. A significant deviation from the baseline distribution may indicate which portion of the end-to-end cellular connection is at fault. The identified states are used by the NMS 126 to localize the causes of failures. For example, as discussed in greater detail below, the NMS 126 determines whether the likely cause of the failures are due to the device experiencing the problem, one or more network elements, a backend service, a partner network, and/or the like. One advantage the NMS 126 is that it does not require any additional monitoring probes in the network elements, user devices, back-end servers, and network elements of other operators. The NMS 126 utilizes CDR data, which is already generated in real-time within current cellular systems. As a result, no changes are needed to current network systems and no additional control data is generated for this purpose; rather the existing CDR data-stream is intelligently analyzed to localize faults.

The NMS 126, in one embodiment, comprises a CDR data stream processor 132, a base statistical model manager 134, an outlier detector 136, and an outlier analyzer 138. Each of these components for the NMS 126 is discussed in greater detail below. In one embodiment, the NMS 126 is located within one or more servers 140. In other embodiments, the NMS 126 (or at least one of its components) resides at the source of the CDRs 128 (e.g., the MSC 121 and/or the SGSN 122). The server 140, in one embodiment, is a datacenter that receives CDRs 128 from a network element such as the MSC 121 and/or the SGSN 122 for billing purposes. The server 140, in one embodiment, stores CDRs 128 for a given period of time. Stated differently, the server 140 stores and maintains historical CDR data for a given amount of time. In another embodiment, the server 140 processes CDR data using a streaming processing paradigm without storing them as historical data. In addition to CDR data, the server 140 can also include other information such as records of user addresses, user billing plans, etc.

Fault Detection and Localization

As discussed above, the NMS 126 utilizes CDRs 128, which are generated for billing purposes, to detect and localize failures (and their causes) experienced by users of the network 102 based on CDRs 128. In one embodiment, the NMS 126 obtains/receives a plurality of CDRs 128 generated by, for example, the MSC 121 and/or the SGSN 122. The NMS 126, in one embodiment, receives the CDRs 128 in real-time (i.e., as they are generated) or at predefined intervals. A CDR 128 is a formatted measure of a UE's service usage information (placing a phone call, accessing the Internet, etc.). For example, a CDR 128 includes information related to a telephone voice or data call such as (but not limited to) the origination and destination addresses of the call; the time the call started and ended; the duration of the call; the time of day the call was made; call termination and error codes; and other details of the call. A CDR 128 also comprises some (partial) information about which network elements handled the particular call including, but not limited to, source cell site identifiers and destination cell site identifiers. A CDR 132 is typically generated by one or more network functions that supervise, monitor, and/or control network access for the device, such as the MSC 121 for voice calls and the SGSN 122 for data calls.

Figure 2:
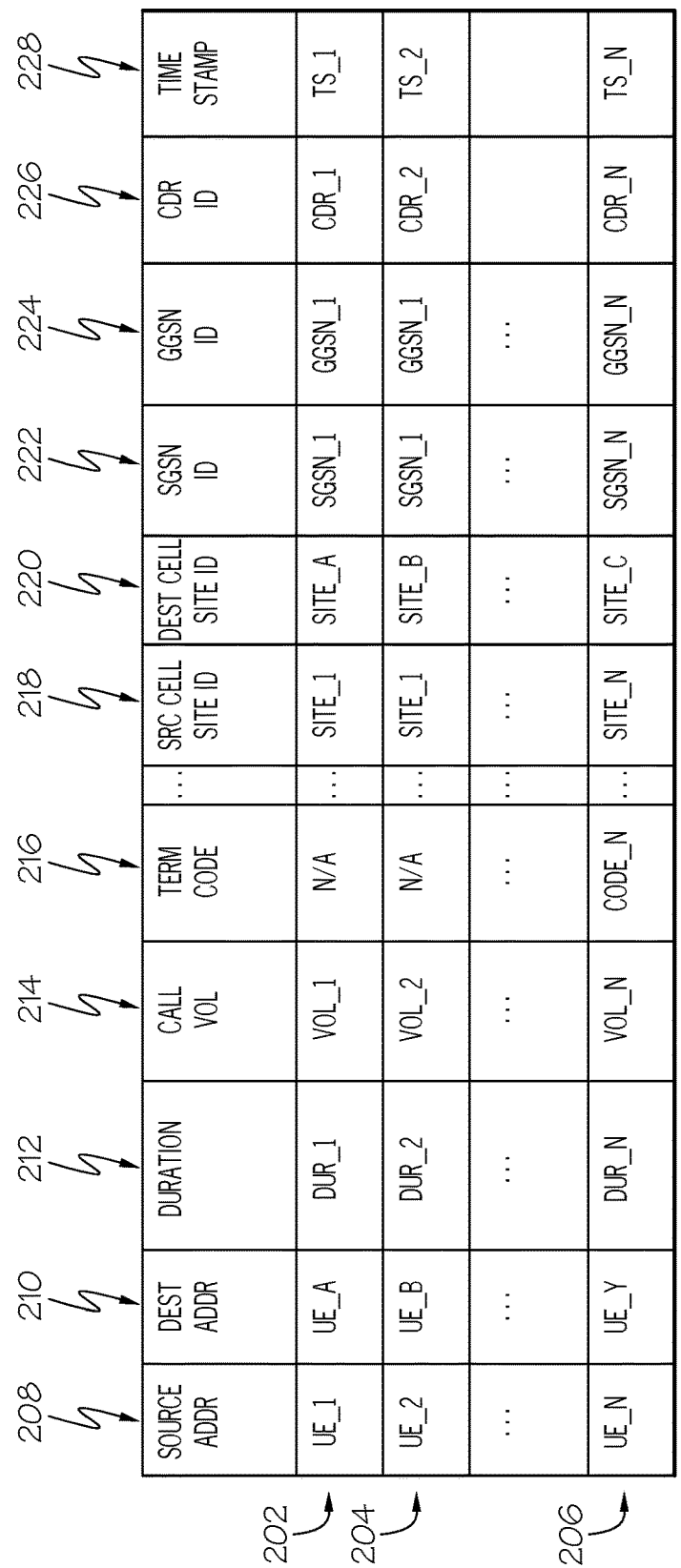
FIG. 2 illustrates various examples of call detail records according to one embodiment of the present invention.

FIG. 2 shows various examples of CDR records. In the example of FIG. 2 each row 202, 204, 206 corresponds to a separate CDR. In this example, each CDR 202, 204, 206 comprises entries identifying flow information such as (but not limited to) the source/origination address 208 of the call; the destination address 210 of the call; temporal information 212 (e.g., duration, start and end times, etc.) associated with the call; the data volume 214 of the call; and call termination and error codes 216. Each CDR 202, 204, 206 also comprises entries comprising partial network information such as (but not limited to) a source cell site identifier (ID) 218; and a destination cell site ID 220; the ID 222 of the SGSN that handled the call; and the ID 224 of the GGSN that handled the call. FIG. 2 also shows that a CDR can comprise information specific to the CDR itself such as (but not limited to) an ID 226 uniquely identifying the CDR and a time stamp 228 identifying when the CDR was generated. It should be noted that another example of a CDR format is provided by the 3GPP specification 32.297 (see 3gpp.org/ftp/Specs/html-info/32297.htm), which is hereby incorporated by reference.

The CDR data stream processor 132 of the NMS 126 pre-processes each of the CDRs 128 as the NMS 126 receives them. This pre-processing of CDRs includes (but is not limited to) removing CDRs with missing/erroneous entries and filtering the CDRs based on specific features required for baseline statistical model generation or outlier detection. Examples of features include (but are not limited to) geographic regions, user types, device types, and/or the like. The pre-processed CDRs are then passed to the statistical model manager 134 for generating (or updating) a dynamic baseline statistical model 130. The model 130, in one embodiment, models the data connection and/or voice call failures from received CDR data.

The statistical model manager 134 generates a baseline model 130, in one embodiment, per cell, per region, per network element, or a combination thereof. The generated model 130 is utilized by the NMS 126 as a representation of the normal network state in the corresponding cell, region, network element, or combination thereof. The baseline model 130, in one embodiment, is a dynamic model that is continuously updated as new CDR data is received. In one embodiment, the baseline model 130 is generated by calculating the empirical average failure rate of all CDRs for each cell, each geographic region, each network element, or for the entire network. In this embodiment, the statistical model manager 134 identifies CDRs 128 associated with a call fault based on the termination and/or failure codes within the CDRs. In another embodiment, the baseline model 130 comprises more detailed statistical information such as (but not limited to) the average and variance, or the distribution of the failure rates. The baseline model 130, in one embodiment, can be constructed per groups of devices that share common characteristics such as (but not limited to) device model, OS type and version, device capability (e.g., 2G vs. 3G vs. 4G), etc. The baseline model 130 can also be constructed based on the destination network in the CDRs 128. For example, a baseline model 130 can be generated based on the IP domain of the data connections' destinations; the identifier of the external network in the voice CDRs; and/or the like.

Once a baseline model(s) 128 is generated any subsequent CDRs 128 obtained and processed by the CDR processor 132 are used to update the model 130 based on the information therein. In addition, after being processed by the CDR processor 132 these new CDRs 128 are sent to the outlier detector 136 for analysis. In particular, the outlier detector 136 analyzes the CDR dataset received from the CDR processor 132 to identify any outliers in the current CDR dataset. Outliers are collection of CDRs where each CDR 128 in the collection exhibits characteristics that deviate significantly (i.e., by at least a given threshold) from the characteristics of the baseline model 130. Examples of outliers include CDRs of a single mobile device that exhibit higher failure rates than the baseline model across multiple cells; CDRs of data connections to a specific uniform resource locator (URL) or domain that exhibit higher failure rates than the baseline model; CDRs of voice calls to a specific external network that exhibit higher call attempt failure rates or call dropping rates than the baseline model; and CDRs of connections belonging to a specific network path from cell-tower to core gateways that exhibit higher failure rate than the baseline model.

The outlier detector 136, in one embodiment, can utilize various methods for detecting and identifying outlier instances. In one embodiment, the outlier detector 136 identifies a group of CDRs as an outlier if the failure rate of that group is higher by a certain threshold than the average of the baseline model 130. In another embodiment, more complex statistical methods can be used for outlier detection. For example, the outlier detector 136 can utilize regression analysis, wherein the failure rate is modeled as a linear combination of a certain set of relevant metrics such as the user intensity of a cell-site, the total traffic load, etc. Based on this linear model the CDR data points that deviate significantly from the linear model are identified as outliers.

Once a set of outliers is detected, the outlier analyzer 138 analyzes the CDRs 128 classified as outliers and infers the likely location of the sources of the failures based on the characteristics of the outliers and using a multi-dimensional correlation. The multi-dimensional correlation involves analysis of the CDR set across different attributes, such as across cell-sites or across time. The overlapping set of outliers computed across each dimension is then identified.

The identified source of the fault and its location are then stored for further processing and/or review. In one embodiment, the outlier analyzer 138 takes as input the outlier CDRs 128 identified by the outlier detector 136, and a history of outliers identified in the past. For example, the history may comprise the following data: a group of outlier CDRs, their outlier score (numeric value that indicates how much abnormal a given CDR is in terms of failure and performance degradation compared to other CDRs), timestamp for the CDR indicating when the call was made, etc. The outlier analyzer 138 analyzes the outliers and the historical outlier information to localize/identify the cause of the failures associated with the outliers. For example, if a current set of CDRs and a historical set of CDRs for a single mobile device indicate that the device experiences higher failure rates than the baseline model 130 across multiple cells, regions, or network elements then the outlier analyzer 138 determines that this device's failures are likely caused by the faults in the device itself (e.g., outdated hardware, unstable/older version applications or operating system). If a current set of CDRs and a historical set of CDRs for mobile devices indicate that the devices experience higher failure rates consistently in a specific location than devices in other locations, the failures are determined likely to be due to a poor coverage in that area or interference. Similarly, if a group of CDRs for the connections to a specific OTT provider site, domain, or network indicates higher failure rates than the baseline model 130, the problem is likely within that OTT site, domain, or network. Similarly, if a higher failure rate is observed for calls that pass through a partner network, then the problem is likely within the partner network.

Operational Flow Diagrams

Figure 3:
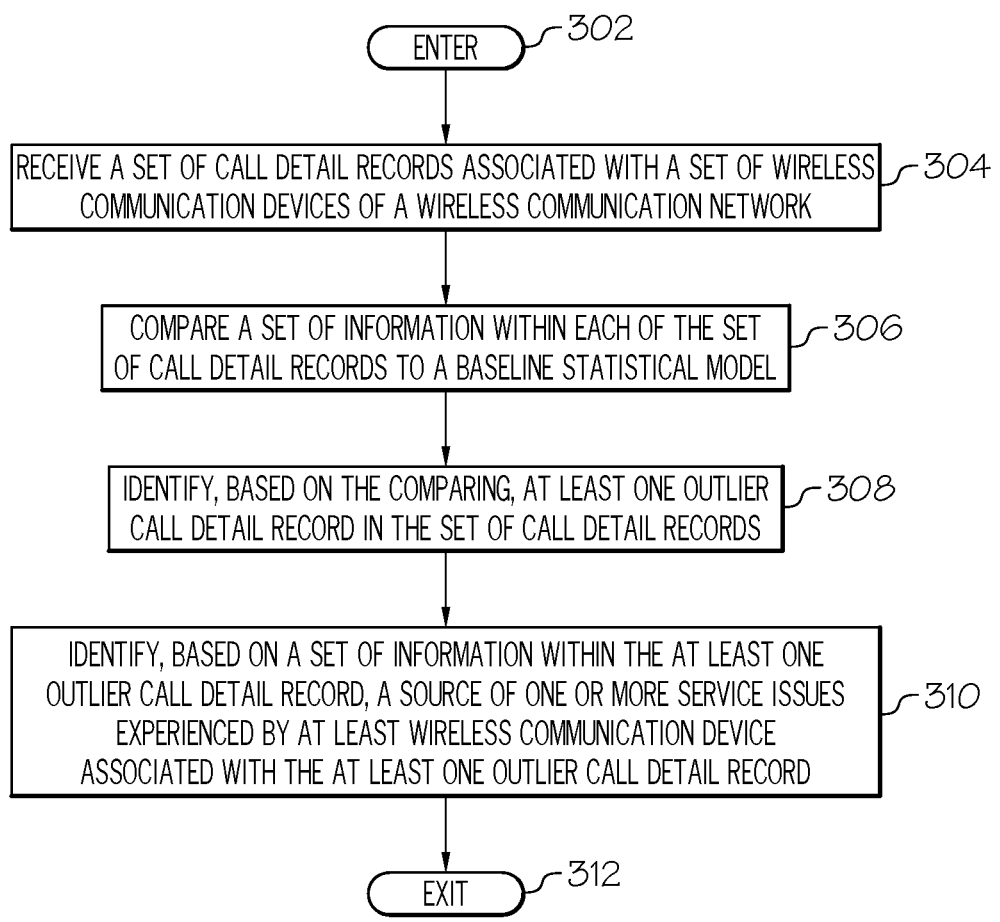
FIG. 3 is an operational flow diagram illustrating one example of managing service issues in a wireless communication network according to one embodiment of the present invention.

FIG. 3 is an operational flow diagram illustrating one example of fault localization and root-cause analysis for a wireless communications network. The operational flow diagram of FIG. 3 begins at step 302 and flows directly to step 304. The NMS 126, at step 304, receives a one or more CDRs 128 associated with a set of wireless communication devices 108 of a wireless communication network 102. The NMS 126, at step 306, compares a set of information within each of the one or more CDRs 128 to a baseline statistical model 130. The baseline statistical model 130 identifies a normal operating state of the wireless communication network 102. The NMS 126, at step 308, identifies an outlier call detail record, if present, in the one or more CDRs 128 based on the comparison. The outlier call detail record indicates that at least one wireless communication device associated with the at least one outlier call detail record experienced one or more service issues. The control flow exits at step 310.

Information Processing System

Figure 4:
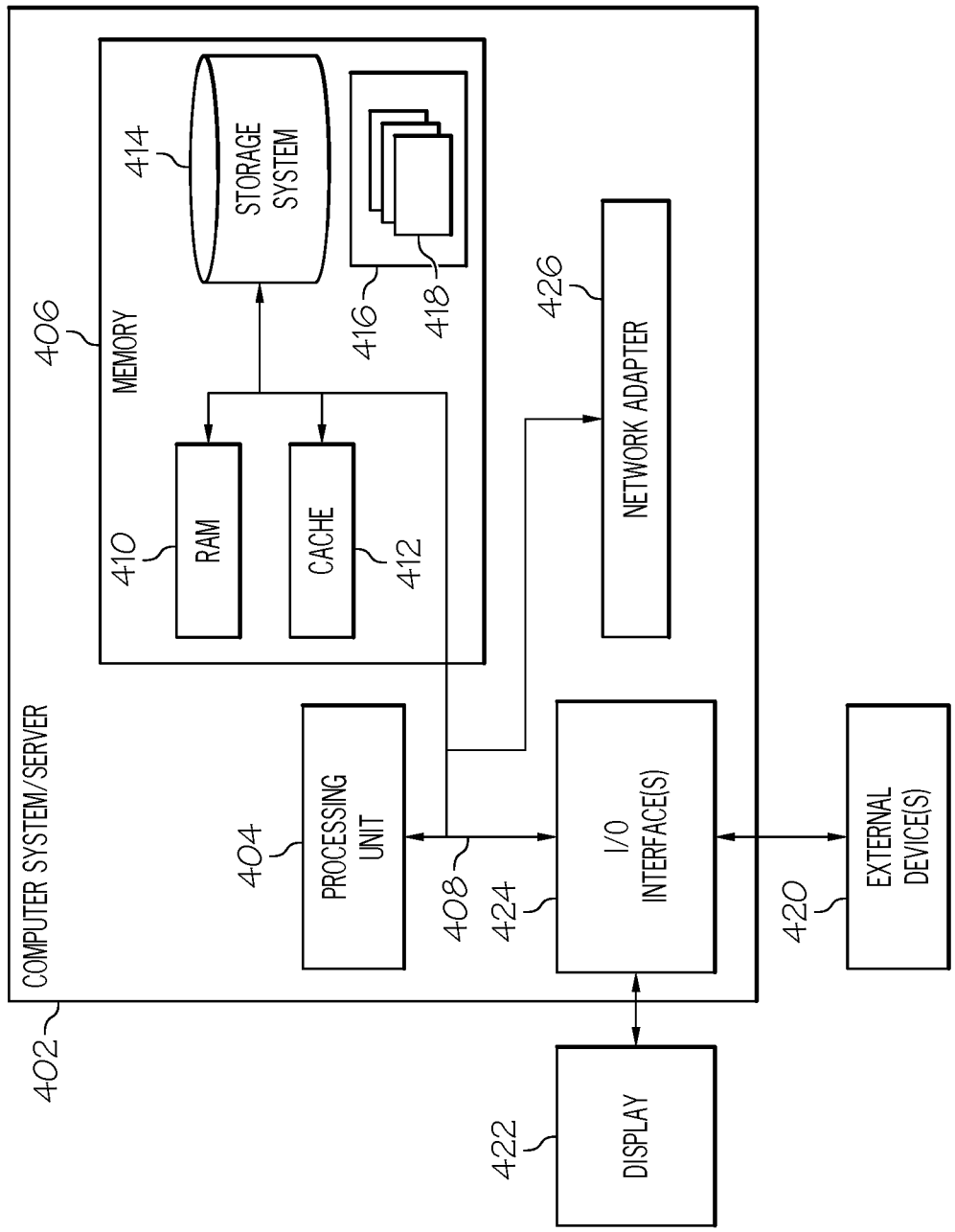
FIG. 4 is a block diagram illustrating one example of an information processing system according to one embodiment of the present invention.

Referring now to FIG. 4, this figure is a block diagram illustrating an information processing system that can be utilized in various embodiments of the present invention. The information processing system 402 is based upon a suitably configured processing system configured to implement one or more embodiments of the present invention. Any suitably configured processing system can be used as the information processing system 402 in embodiments of the present invention. The components of the information processing system 402 can include, but are not limited to, one or more processors or processing units 404, a system memory 406, and a bus 408 that couples various system components including the system memory 406 to the processor 404.

The bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 4, the main memory 406 includes at least the NMS 126 and its components shown in FIG. 1. Each of these components can reside within the processor 404, or be a separate hardware component. The system memory 406 can also include computer system readable media in the form of volatile memory, such as random access memory (RAM) 410 and/or cache memory 412. The information processing system 402 can further include other removable/non-removable, volatile/non-volatile computer system storage media. By way of example only, a storage system 414 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 408 by one or more data media interfaces. The memory 406 can include at least one program product having a set of program modules that are configured to carry out the functions of an embodiment of the present invention.

Program/utility 416, having a set of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of embodiments of the present invention.

The information processing system 402 can also communicate with one or more external devices 420 such as a keyboard, a pointing device, a display 422, etc.; one or more devices that enable a user to interact with the information processing system 402; and/or any devices (e.g., network card, modem, etc.) that enable computer system/server 402 to communicate with one or more other computing devices. Such communication can occur via I/O interfaces 424. Still yet, the information processing system 402 can communicate with one or more networks such as a local area network (LAN), a general wide area network (WAN), and/or a public network (e.g., the Internet) via network adapter 426. As depicted, the network adapter 426 communicates with the other components of information processing system 402 via the bus 408. Other hardware and/or software components can also be used in conjunction with the information processing system 402. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing service issues within a wireless communication network, the method comprising:
    obtaining, based on electronically communicating with at least one external information processing system, one or more call detail records associated with a set of wireless communication devices of the wireless communication network, wherein each of the one or more call detail records is a formatted measure of service usage information for a wireless communication device in the set of wireless communication devices;
    determining that at least one of the one or more call detail records is an outlier call detail record by at least comparing a set of information within each of the one or more call detail records to a baseline statistical model, wherein the baseline statistical model identifies a normal operating state of the wireless communication network, and wherein the at least one outlier call detail record indicates that at least one wireless communication device associated with the at least one outlier call detail record experienced one or more service issues;

in response to the determining, analyzing the at least one outlier call detail record and a set of historical outlier call detail records associated with the at least one wireless communication device, wherein the analyzing comprises correlating the at least one outlier call detail record with each of the set of historical outlier call detail records across one or more dimensions, and identifying, based on the correlating, a plurality of overlapping outlier call detail records; and identifying, based on the plurality of overlapping outlier call detail records, one of the at least one wireless communication device or one or more portions of the wireless communication network as a cause of the one or more service issues, wherein in response to identifying one or more portions of the wireless communication network as the cause of the one or more service issues, storing a location of the one or more portions that have been identified.

2. The method of claim 1, further comprising:
updating the baseline statistical model based on the one or more call detail records.

3. The method of claim 2, wherein the method further comprises:
generating, prior to receiving the one or more call detail records, the baseline statistical model based on a set of information within a plurality of call detail records associated with the wireless communication network.

4. The method of claim 3, wherein the generating comprises:
analyzing each of the plurality of call detail records; and
generating, based on the analyzing, a baseline of failure rates associated with at least a portion of the wireless communication network.

5. The method of claim 1, wherein determining that the at least one of the one or more call detail records is an outlier call detail record comprises:
determining one or more characteristics of the at least one of the one or more call detail records deviate from a set of corresponding characteristics in a baseline statistical model by at least a given threshold, wherein the baseline statistical model identifies a normal operating state of the wireless communication network.

6. The method of claim 1, wherein each of the set of historical outlier call detail records comprises one or more characteristics that deviated from a set of corresponding characteristics in a historical baseline statistical model by at least a given threshold.

7. An information processing system for managing service issues within a wireless communication network, the information processing system comprising:
a memory;
a processor communicatively coupled to the memory; and
a network monitoring system communicatively coupled to the memory and the processor, wherein the network monitoring system is configured to perform a method comprising:
obtaining, based on electronically communicating with at least one external information processing system, one or more call detail records associated with a set of wireless communication devices of the wireless communication network, wherein each of the one or more call detail records is a formatted measure of service usage information for a wireless communication device in the set of wireless communication devices;

determining that at least one of the one or more call detail records is an outlier call detail record by at least comparing a set of information within each of the one or more call detail records to a baseline statistical model, wherein the baseline statistical model identifies a normal operating state of the wireless communication network, and wherein the at least one outlier call detail record indicates that at least one wireless communication device associated with the at least one outlier call detail record experienced one or more service issues;

in response to the determining, analyzing the at least one outlier call detail record and a set of historical outlier call detail records associated with the at least one wireless communication device, wherein the analyzing comprises correlating the at least one outlier call detail record with each of the set of historical outlier call detail records across one or more dimensions, and identifying, based on the correlating, a plurality of overlapping outlier call detail records; and identifying, based on the plurality of overlapping outlier call detail records, one of the at least one wireless communication device or one or more portions of the wireless communication network as a cause of the one or more service issues, wherein in response to identifying one or more portions of the wireless communication network as the cause of the one or more service issues, storing a location of the one or more portions that have been identified.

8. The information processing system of claim 7, wherein the method further comprises:
updating the baseline statistical model based on the one or more call detail records.

9. The information processing system of claim 7, wherein determining that the at least one of the one or more call detail records is an outlier call detail record comprises:
determining one or more characteristics of the at least one of the one or more call detail records deviate from a set of corresponding characteristics in a baseline statistical model by at least a given threshold, wherein the baseline statistical model identifies a normal operating state of the wireless communication network.

10. The information processing system of claim 7, wherein each of the set of historical outlier call detail records comprises one or more characteristics that deviated from a set of corresponding characteristics in a historical baseline statistical model by at least a given threshold.

11. A computer program storage product for managing service issues within a wireless communication network, the computer program storage product comprising a non-transitory storage medium readable by a processing circuit and storing instructions executed by the processing circuit for performing a method comprising:
obtaining, based on electronically communicating with at least one external information processing system, one or more call detail records associated with a set of wireless communication devices of the wireless communication network, wherein each of the one or more call detail records is a formatted measure of service usage information for a wireless communication device in the set of wireless communication devices;

determining-that at least one of the one or more call detail records is an outlier call detail record by at least comparing a set of information within each of the one or more call detail records to a baseline statistical model, wherein the baseline statistical model identifies a normal operating state of the wireless communication network, and wherein the at least one outlier call detail record indicates that at least one wireless communication device associated with the at least one outlier call detail record experienced one or more service issues;

in response to the determining, analyzing the at least one outlier call detail record and a set of historical outlier call detail records associated with the at least one wireless communication device, wherein the analyzing comprises
- correlating the at least one outlier call detail record with each of the set of historical outlier call detail records across one or more dimensions, and
- identifying, based on the correlating, a plurality of overlapping outlier call detail records; and identifying, based on the plurality of overlapping outlier call detail records, one of
- the at least one wireless communication device or
- one or more portions of the wireless communication network as a cause of the one or more service issues, wherein in response to identifying one or more portions of the wireless communication network as the cause of the one or more service issues, storing a location of the one or more portions that have been identified.

12. The computer program storage product of claim 11, further comprising:
updating the baseline statistical model based on the one or more call detail records.

13. The computer program storage product of claim 12, wherein the method further comprises:
generating, prior to receiving the one or more call detail records, the baseline statistical model based on a set of information within a plurality of call detail records associated with the wireless communication network.

14. The computer program storage product of claim 11, wherein determining that the at least one of the one or more call detail records is an outlier call detail record comprises:
determining one or more characteristics of the at least one of the one or more call detail records deviate from a set of corresponding characteristics in a baseline statistical model by at least a given threshold, wherein the baseline statistical model identifies a normal operating state of the wireless communication network.

* * * * *